Oct. 14, 1958 P. A. ROOS 2,855,701
NAVIGATION TRAINING DEVICE
Filed July 3, 1952 7 Sheets-Sheet 1
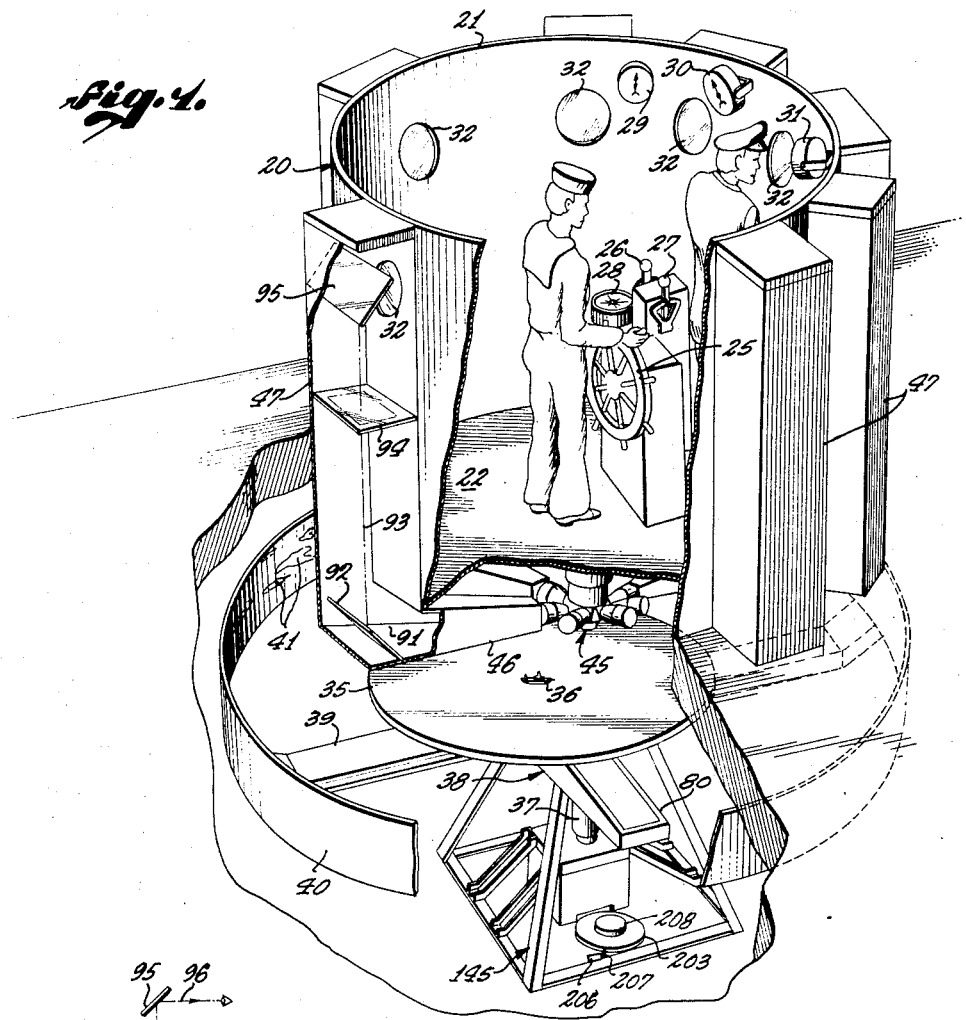
PAUL A. ROOS,
INVENTOR.
BY *George V. Smyth*
ATTORNEY.

Oct. 14, 1958  P. A. ROOS  2,855,701
NAVIGATION TRAINING DEVICE
Filed July 3, 1952  7 Sheets-Sheet 2
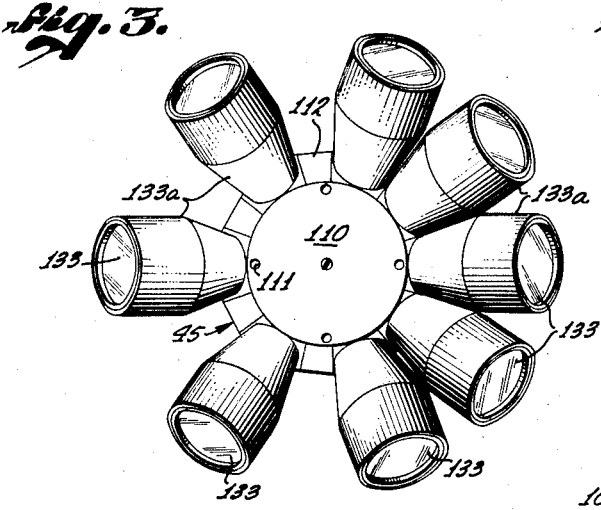
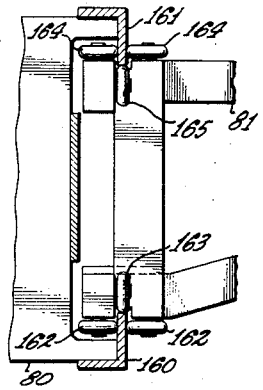
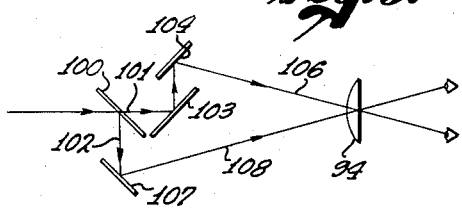
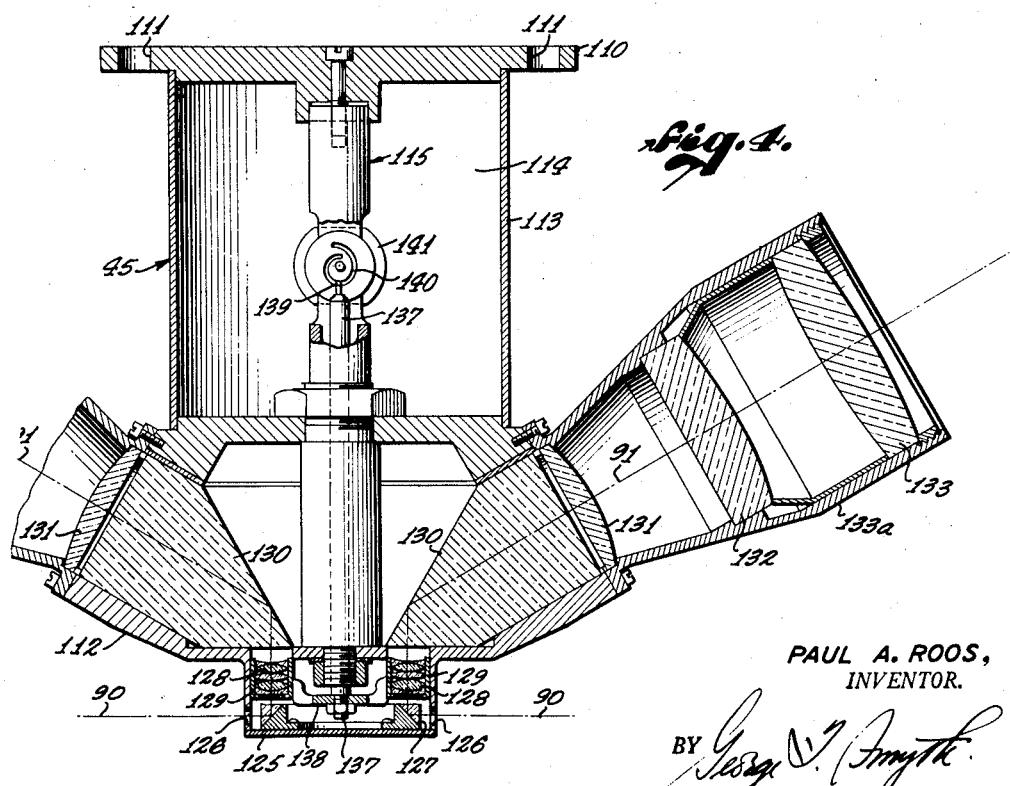
PAUL A. ROOS,
INVENTOR.
BY
ATTORNEY.

Oct. 14, 1958  P. A. ROOS  2,855,701
NAVIGATION TRAINING DEVICE
Filed July 3, 1952  7 Sheets-Sheet 3

PAUL A. ROOS,
INVENTOR.

BY George W. Smyth

ATTORNEY.

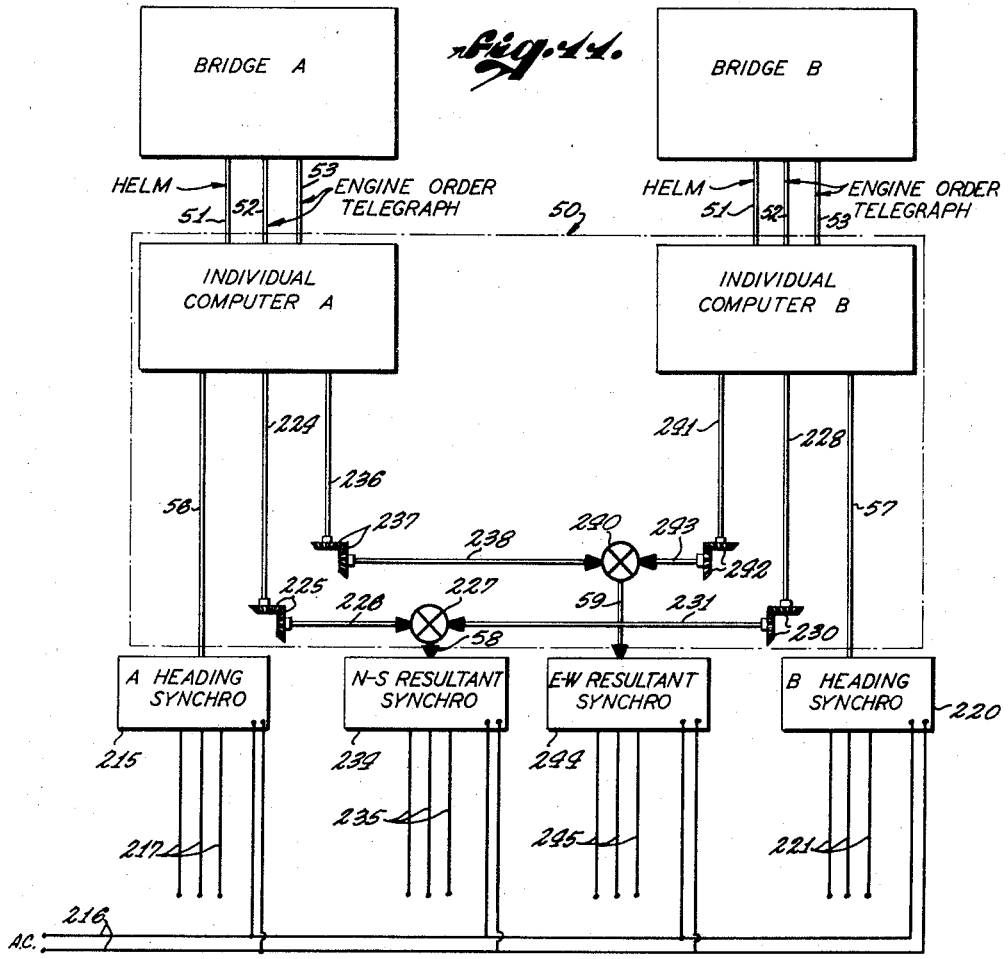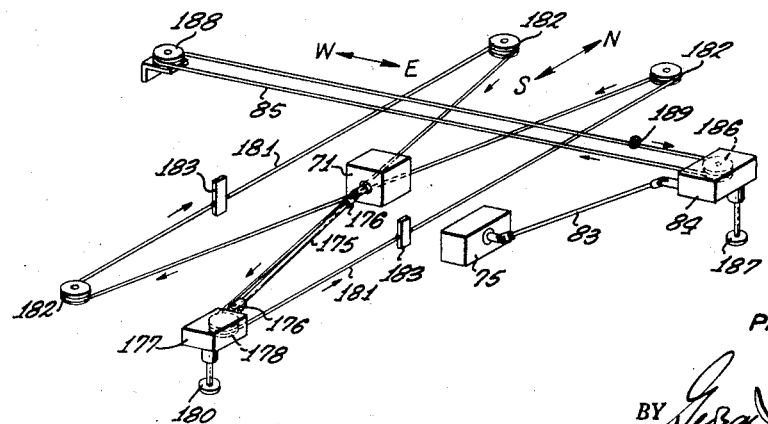

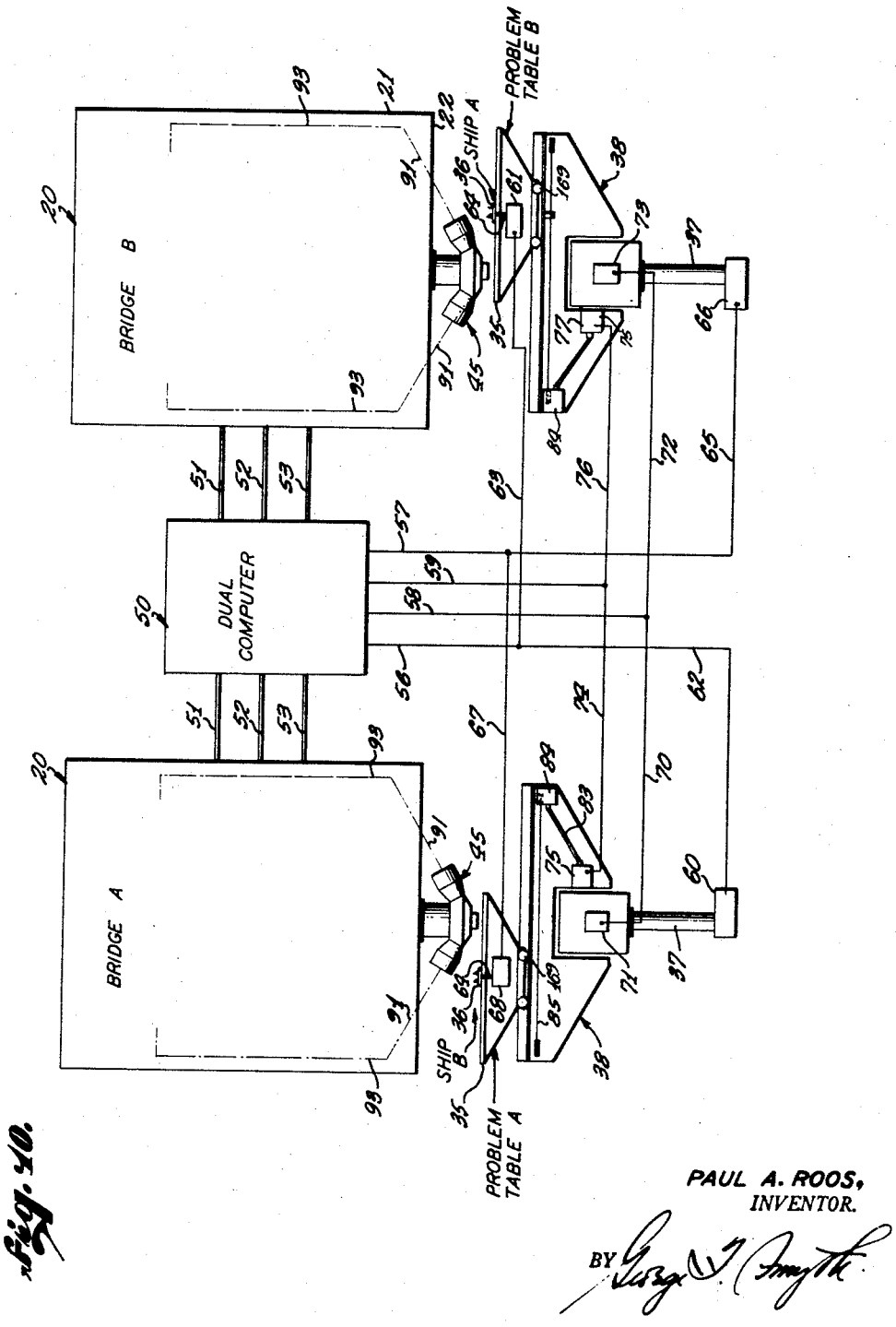

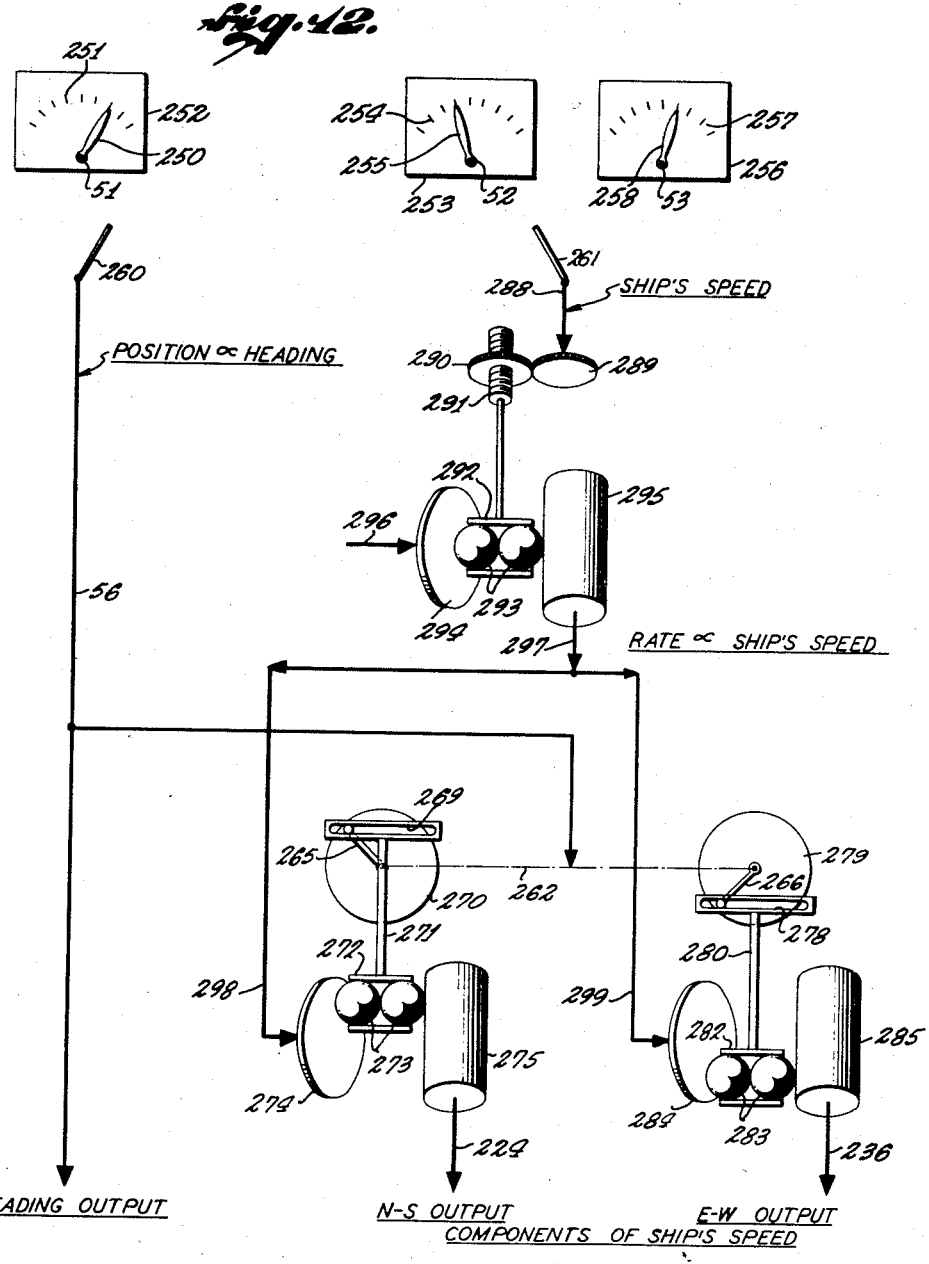

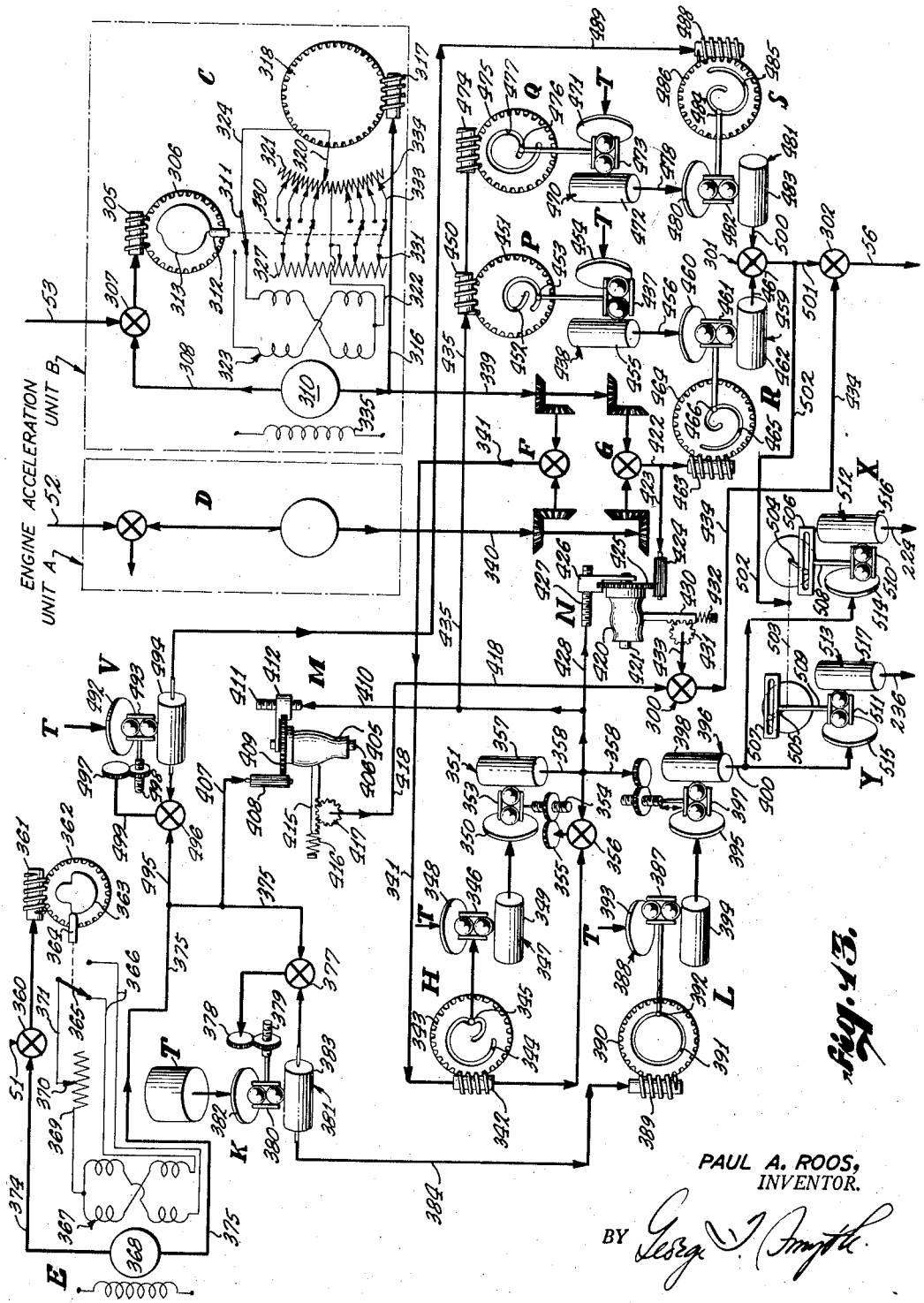

United States Patent Office 2,855,701
Patented Oct. 14, 1958

2,855,701

NAVIGATION TRAINING DEVICE

Paul A. Roos, Los Angeles, Calif.

Application July 3, 1952, Serial No. 297,853

14 Claims. (Cl. 35—10.2)

This invention relates to navigation training devices for developing seamanship or the ability to maneuver a ship and, more particularly, pertains to a training system that both includes simulated shiphandling controls for manipulation by trainees and provides response to the ship controls to simulate the actual responsive behavior of a real ship moving under its own power.

It is contemplated that the system, which may be small enough to install in an ordinary room, will provide sufficiently complete realism to prepare a trainee fully for actual ship maneuvers and emergency shiphandling at sea. Such realism must include simulated changes in speed and heading of a ship, preferably in full accord with a ship's characteristic responses to its navigation controls, and must include simulated changes in position of the ship relative to hazards and other ships in a simulated area of navigation. The invention achieves the required realism by a combination of mechanical, electrical and optical means.

A feature of the invention is the concept that the required realism may be achieved by using what may be termed a problem table to represent a sea area in combination with an optical system viewing the simulated sea area as seen in directions radiating from a preselected point on the table and presenting the images with suitable magnification for view along corresponding lines of sight radiating outward from a control station, the control station simulating the bridge of a ship. Thus, the position of the preselected point relative to the area of the problem table corresponds to the position of a hypothetical ship on the simulated sea area and the resulting magnified images as viewed outwardly from the control station correspond realistically to the sea area as viewed in different directions from the bridge of the hypothetical ship.

In the preferred practice of the invention, the control station is enclosed by a circular or polygonal wall having port holes and a scanning head adjacent the problem table sights in various directions radiating from the preselected point on the problem table, the various directions corresponding to the port holes. By appropriate design of the optical system, an accurately constructed miniature model of a ship on the problem table representing a second hypothetical ship in the sea area may be viewed from the control station with the realism of a real ship and a change of a few inches of the distance of the ship model from the scanning head will have the appearance at the control station of a change of hundreds of yards. Thus, a relatively small problem table may accurately represent a sea area stretching to the horizon. Preferably, such realism is enhanced by surrounding the table with a rotatable circular wall having painted clouds to represent the sky around the horizon. Any model of a hazard such as a rock or small island may be substituted for or installed in addition to the ship model if desired.

Simulated movement of the first hypothetical ship that is represented by the control station and scanning head relative to the second hypothetical ship represented by the miniature model may be created by causing relative movement between the scanning head of the optical system and the model on the problem table. For training purposes, any suitable means may be utilized to cause such relative movement in accord with adjustment and manipulation of simulated navigation controls at the control station. A feature of the preferred embodiment of the invention is that such control is achieved simply by moving the problem table relative to the scanning head of the optical system, the scanning head and control station remaining fixed.

Changes in the heading of the first ship by the navigation controls at the control station may be simulated by causing relative rotation between the scanning head and the problem table in any suitable manner. Here again a feature of the preferred practice of the invention is the concept of adapting the problem table for rotation about an axis passing through the preselected point or center of the scanning head. Thus, the problem table shifts laterally relative to the axis of the scanning head to simulate changes in the relative positions of the two ships and the problem table rotates in an orbit about that axis to simulate changes in heading of the first ship.

In a preferred embodiment of the invention, the scanning head is placed below the control station concentric to the circular series of portholes in the control station and the problem table is placed immediately below the scanning head on a track assembly that is mounted to rotate about the axis of the scanning head. The track assembly has a portion movable in a first direction radially to the axis to provide one component of motion for the problem table and has a second portion movable perpendicularly to said direction to provide a second component of motion. By combining these two components of motion, the ship model on the table may be shifted toward and away from the scanning head in any direction and by rotating the track assembly about its axis, the control station, while actually stationary, may be made to appear, to an observer looking out of one of the port holes, to rotate.

As will be explained, various features of the invention relate to the problem of causing the table to respond in a realistic manner to the navigation controls at the control station, with special reference to the problem of simulating the characteristic responses of a ship to its navigation controls. Thus, the control system should simulate ship acceleration with response to simulated increase of power and the control system should also simulate not only the response of the ship to a rudder, but also the characteristic response to differential propeller action when starboard and port propeller shafts are separately controlled for maneuvering a ship.

While the invention may be embodied as a single control station with its associated problem table and optical system to serve the purpose of training personnel, a special feature of the invention is that it may be embodied as a dual system having two functionally interlocked control stations representing two ships in the same sea area with the same realism at each control station and with the same accurate simulation of all changes in speed, bearing, and relative positions of the two ships. In such a dual system, integrated cross controls are necessary since any simulated maneuver by manipulation of controls at one station must have appropriate effect at the other station.

Each of the two control stations in the dual system has under observation on its problem table a miniature model of a ship corresponding to the other station. When the navigation controls at one station simulate a change in heading, the problem table at the same station revolves about the axis of the scanning head and at the same time the model of a ship at the other station revolves equally about a pivot on the other problem table. Since simulated movement by either control station changes the distance at each problem table from the scanning head to the model on the table, both problem tables shift in response to both control stations. Further features of the invention relate to the attainment of such integrated cross control.

The various features and advantages of the invention may be understood from the following description of a typical dual training system considered with the accompanying drawings.

In the drawings, which are to be regarded as merely illustrative:

Figure 1 is a perspective view showing the apparatus of the present invention with portions broken away to more clearly illustrate the structure;

Figure 2 is a schematic view showing the path of the light rays emanating from the ship model and directed into the eye of the observer;

Figure 3 is a top plan view of the scanning head of the device;

Figure 4 is a sectional view of that portion of the optical system carried by the scanning head;

Figure 5 is a schematic view showing how the optical system may include a beam-splitting arrangement to produce two images for binocular stereoscopic vision at the control station;

Figure 8 is an enlarged fragment of Figure 6 showing a portion of the track assembly;

Figure 9 is a perspective diagrammatic view of the actuating mechanism for the track assembly;

Figure 10 is a schematic view largely in the form of a block diagram showing the major components of the preferred embodiment of the invention as a dual training system;

Figure 11 is a block diagram showing the major components of a dual computer in Figure 10, which dual computer includes two individual computers;

Figure 12 is a schematic view showing the essential components of a manually-controlled individual computer that may be used in the dual computer of Figure 11; and Figure 13 is a schematic view showing the essential components of a wholly automatic individual computer that may be used in the dual training system.

*General arrangement*

Figure 6:
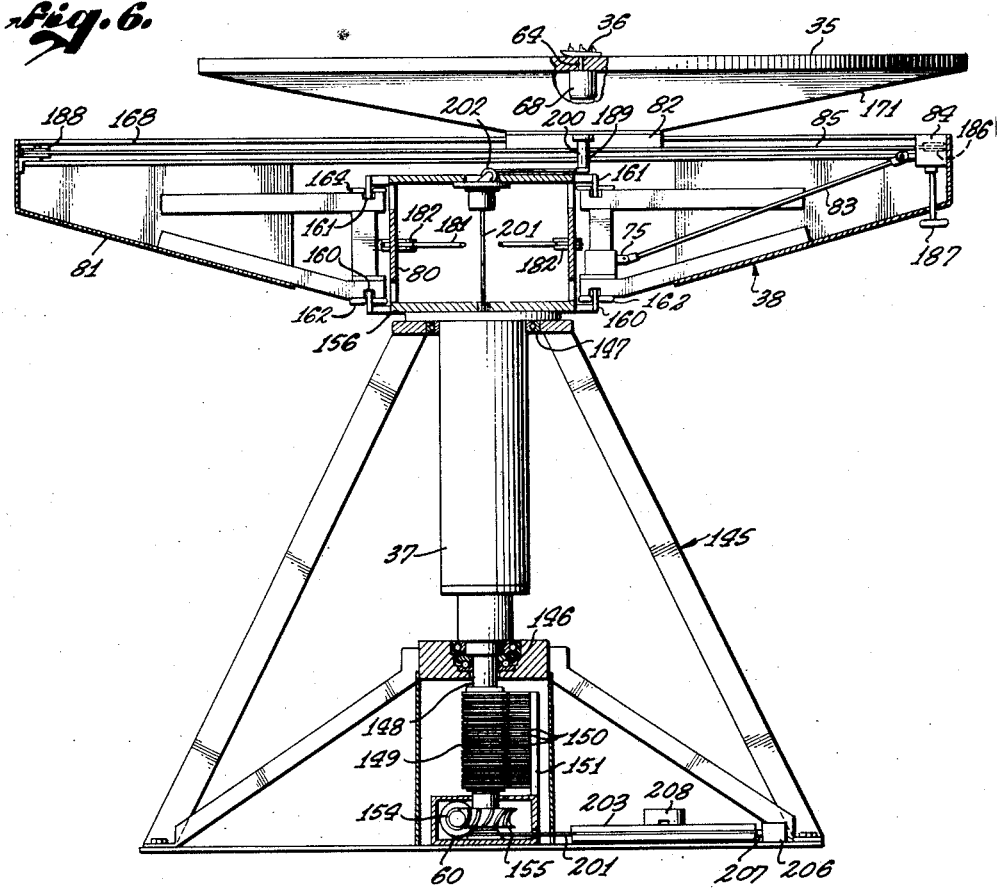
Figure 6 is a view partly in side elevation and partly in section showing the construction of the problem table.

The preferred arrangement of a control station together with its associated problem table and optical system is shown in Figure 1. The control station, generally designated 20, which represents the bridge of a ship, is a circular enclosure having a cylindrical wall 21 and a floor 22, the enclosure being large enough for at least six men. Preferably, the control station is equipped with the following instrumentalities for use in the training procedure: a helm 25, port and starboard engine order telegraph controls 26 and 27, respectively, for the port and starboard propeller shafts of the ship; a simulated gyro-compass repeater 28; a range indicator 29; and various intercommunication devices such as the propeller shaft revolution indicators shown at 30 and 31, and annunciator and including means for communication with the engine room and lookout stations. Each of the engine order telegraph controls 26 and 27 is adjustable in the usual manner for various speeds, ahead and astern, so that differential action on the part of the starboard and port propeller shafts may be used in addition to rudder action for changing the heading of the ship.

Formed in the cylindrical wall 21 at spaced points circumferentially thereof are suitable openings 32 which may, if desired, be closed by sheets of glass or other wholly transparent material. The openings 32 are simulated port holes that provide realistically the same kind of view as port holes on a real ship.

Associated with the control station 20 is a corresponding problem table 35 which may be at any convenient location but preferably is either above or below the control station. In the construction shown, the problem table 35 is positioned below the control station and, as heretofore stated, carries a small replica 36 of a ship model which is mounted for rotation about a fixed pivot on the problem table. The problem table 35 is suitably mounted on a vertical shaft 37 which is preferably concentric to the cylindrical wall of the control station.

To permit the required lateral movement of the problem table relative to the axis of the shaft 37, the shaft carries what may be termed a track assembly generally designated 38 on which the problem table proper is mounted. Thus, the track assembly rotates about a vertical axis concentric with the control station and the track assembly permits the problem table to be moved with two components of motion whereby the ship model 36 is universally movable in the plane of the problem table relative to the vertical axis. In the illustrated embodiment of the present invention, the vertical shaft 37 carries for rotation therewith a suitable frame 39 which supports what may be termed a horizon band 40 in the form of a cylindrical wall on which clouds 41 are painted to represent the sky around the horizon.

The optical system for viewing the problem table 35 and the ship model 36 thereon includes a scanning head, generally designated 45, which is concentric with the vertical axis of the control station and is, therefore, coaxial with the vertical shaft 37 of the problem table. The scaning head 45 receives image forming rays from the problem table area along a number of lines of sight radiating from what may be termed an optical center on the afore-mentioned axis. A number of passage means 46 for light beams radiate from the scaning head 45 to join corresponding vertical box-like passage means 47, each of which leads to one of the port holes 32 at the control station.

It may be readily understood that with the optical system forming erect images of the object spaces of the objectives carried by the scanning head 45 visible to an observer at the port holes 32, the images will be realistically similar to port hole views of a real expanse of ocean and that rotation of the problem table 35 together with the horizon band 40 will create the illusion of the control station rotating in the manner of a real ship changing its heading. The problem table rotates in response to the navigation controls comprising the helm 25, the two engine controls 26 and 27, and the simulated gyro-compass repeater 28, which rotates with rotation of the problem table to indicate changes in heading of the simulated ship in the same manner as a compass on board an actual ship. The track assembly 38 also operates in accord with adjustments of the navigation controls to shift the problem table relative to the control station axis so that the distance of the ship model 36 from the preselected center or control station axis will vary in accord with the simulated maneuvers of the ship represented by the control station.

The general arrangement of the invention as a dual training system is indicated by Figure 10 in which two control stations 20 are designated bridge A and bridge B, respectively, to represent two ships A and B, respectively, in ship maneuver problems. Associated with bridge A is the optical system including a scanning head 45 for observing the surface of an associated problem table A. In like manner, bridge B has an optical system including a second scanning head 45 to view the area of a corresponding problem table B. It will be noted in Figure 10 that the ship model A corresponding to bridge A is on the problem table B and ship model B representing bridge B is on the problem table A.

A suitable cross control system is provided so that the two ship models and the two problem tables will be moved and adjusted in accord with the operation of the navigation controls on the two bridges. The cross control system responds to changes in heading by the navigation controls at bridge A by rotating table A about the station axis and by correspondingly rotating ship model A about its pivot axis on problem table B. In like manner, changes in heading created by the navigation controls on bridge B cause rotation of problem table B about the station axis and corresponding rotation of ship model B about its pivot axis on problem table A.

The navigation controls on both bridge A and bridge B affect both problem tables with respect to the lateral displacement of the ship models from the corresponding station axes and preferably both changes in heading and changes in the apparent distance between the two ships are created in accord with the characteristics of real ships responding to real navigation controls. The preferred practice of the invention includes a dual computer 50 for controlling the two problem tables and the two ship models in the desired manner in response to the navigation controls at the two bridges A and B.

As indicated in Figure 10, the dual computer 50 has three inputs from each of the two control stations, namely, a rotary shaft 51 for changes in adjustment of the helm 25 at the station, and two rotary shafts 52 and 53 to convey changes in adjustment of the starboard and port engine controls 26 and 27, respectively. The dual computer 50 has four outputs, namely, a heading output for ship A, represented by line 56, a heading output for ship B, represented by line 57, a north-south relative motion component output, represented by line 58, and what may be termed an east-west relative motion component output, represented by the line 59.

By a suitable remote control arrangement, the heading output 56 representing changes in heading of ship A is communicated to two positioning motors 60 and 61, respectively, as indicated by lines 62 and 63, respectively, the function of positioning motor 60 being to rotate shaft 37 for rotation of problem table A and the function of positioning motor 61 being to rotate a small spindle 64 by means of which ship model A is pivotally mounted on problem table B. In like manner, Figure 10 shows diagrammatically the heading output 57 for ship B conveyed by a line 65 to a positioning motor 66 and by line 67 to a positioning motor 68, the positioning motor 66 governing the rotary position of vertical shaft 37 to control problem table B and positioning motor 68 controlling a second spindle 64 by means of which ship model B is pivotally mounted on problem table A.

Figure 10 shows the north-south relative motion component 58 connected by a line 70 with what may be termed a north-south positioning motor 71 associated with problem table A and connected by a line 72 with a similar north-south positioning motor 73 associated with problem table B. In like manner, the east-west relative motion component output 59 is shown connected by a line 74 with an east-west positioning motor 75 associated with problem table A and connected by the line 76 with a second east-west positioning motor 77 associated with problem table B.

The two positioning motors 71 and 75 of problem table A,, for example, are incorporated in the corresponding track assembly 38. Broadly described, each track assembly comprises a radial or diametrical track member 80, a cross track member 81 and a carriage 82. The radial track member 80 which is mounted on the vertical shaft 37 for rotation therewith carries the loads imposed by the elements making up the problem table and forms the main support member for those elements. This track member is provided with suitable means to movably support the cross track member 81, which cross track member is normal to the radial track member and is movable thereon toward and away from the axis of the vertical shaft 37. The carriage 82 is in turn mounted for movement on the cross track member 81 longitudinally thereof and carries the associated problem table 35.

The north-south positioning motor 71 in the track assembly is mounted in the radial track member 80 to control movements of the cross track member 81 and the east-west positioning motor 75 is mounted in the cross track member 81 to control the position of the carriage 82 thereon. The positioning motor 75 is operatively connected by an inclined shaft 83 to a gear box 84 which controls a cable 85 for actuating the carriage 82.

Optical system

As heretofore indicated, the optical system at each control station 20 comprises a radial array of a plurality of identical optical systems, the purpose of each of which is to form an erect image of the object space of the objective of each system to the eye of an observer adjacent the corresponding port hole 32 of the control station. Figure 2 schematically illustrates the optical path of one of the individual systems and depicts a beam of light along a radial line of sight 90 entering the scanning head 45 which redirects the beam radially outward and upward along the axis 91 through the corresponding previously mentioned passage means 46 to a mirror 92 at the bottom of passage means 47. As indicated by the vertical axis 93, the light beam is reflected upward from the mirror 92 through a suitable field lens 94 to a second mirror 95 which deflects the beam radially inward along the axis 96 through the corresponding port hole 32 in the control station.

Basically the optical system comprises an objective lens assembly, carried by the scanning head 45, and preferably having a relatively short focal length to provide a large depth of focus. The real image of objects viewed by the objective lens assembly of each system are formed intermediate the latter and an erecting relay lens assembly, also carried in the illustrated embodiment of the invention by the scanning head 45. This relay lens assembly forms a real image of the object, which image is viewed by an observer in the control station by means of the field lens 94. The image, as viewed by the observer, will be erect and appear to be located between a maximum distant position and a minimum distant position depending upon the position of the ship's model in the object space of the objective lens assembly. The minimum distant position will actually be the minimum comfortable viewing distance for the eye of the observer.

The objective lens assembly and the erecting relay lens assembly, in the now preferred embodiment of the present invention, are so formed relative to the field lens that the image of the ship's model when located at the maximum distance from the scanning head 45 will be formed at the front focal plane of the field lens 94, while the image formed when the ship's model is at the minimum distance from the scanning head will actually be disposed at the back focal plane of the field lens. It is obvious for at least one position of the ship's model that the image will actually be formed internally of the field lens 94.

The field lens forms an image of the erecting relay lens assembly and defines a relatively large exit pupil or aerial viewing station from numerous positions in which an observer may view the image. As the aerial viewing station defined is actually a large one, the eye of the observer need not be placed in any exact location to view the image of the ship model. This adds to the realism of the device and renders the training operation more interesting to the trainee.

The optical system above described will, of course, present but one exit pupil which, if made sufficiently large, could provide binocular stereoscopic vision. Where binocular stereoscopic vision is desired, however, it is now preferred to actually present two exit pupils arranged side by side. In this embodiment of the optical system, the rays emerging from the erecting relay lens assembly are formed or split into two pencils of rays and this may be brought about by placing suitable beam splitting means in the optical path of the rays at some point in the system, preferably intermediate the erecting relay lens assembly and the eye of the observer. If the beam splitting means is placed between the erecting relay lens and the field lens 94, a beam emerging from the former, referring now to Figure 5, is partially reflected and partially transmitted by a semi-transparent glass plate 100 angularly disposed in the optical path. The portion of light transmitted and forming the beam 101 is reflected by two angularly related mirrors 103 and 104 to enter the field lens 94 along the axis 106 while the beam 102, formed by the light reflected by the plate 100, is deflected by the mirror 107 along a second axis 108 to the lens 94. The lens 94, because of the angular disposition of the axes 106 and 108, forms a pair of horizontally displaced images of the erecting relay lens. In addition, the angularly related mirrors 100, 103, 104, and 107 cooperate with the erecting relay lens assembly to form a pair of images of the ship's model located at selective points along the axis 106 and 108. These images are preferably superimposed at the intersection of axis 106 and 108 at lens 94 to maintain the proper accommodation-convergence ratio of the eyes of an observer to obviate discomfort to the observer during a training program.

Returning now to Figure 4 illustrating the scanning head 45 and the optical elements carried thereby, the scanning head is intended to be mounted on the underside of the floor 22 by a suitable support plate 110 formed with a plurality of apertures 111 for receiving mounting bolts passed through the floor. The scanning head 45 includes a housing 112 depending from a cylindrical support member 113 secured to the support plate 110 and forming a small chamber 114. The scanning head assembly may be held together by suitable means including an axial clamping structure, generally designated 115, which need not be described in detail. The scanning head housing 112 is formed with a cylindrical extension 125 at the lower end thereof concentric with the previously mentioned preselected point on the control station axis determined by the vertical shaft 37 of the associated problem table.

Spaced around the periphery of the cylindrical extension 125 is a series of small sight openings 126, each of which corresponds to one of the radial lines of sight 90 for passing image-forming rays from the area of the associated problem table. The beam of light entering a sight opening 126 is reflected upward by a prism 127 mounted in the extension 125 through the objective lens assembly here shown as a plurality of lens elements 128 mounted in a sleeve or barrel 129. The image forming rays emerging from the objective lens system pass into a prism 130 and are internally reflected into the erecting relay assembly formed in part by the lens elements 131, 132, and 133 carried in a lens barrel 133a mounted on the scanning head housing 112 as shown.

Actually the large prism 130 forms a part of the erecting relay system in that it allows a lens system of large aperture to be installed in a smaller space than would be possible if a simple reflector were used. Thus, the system shown has a relatively large aperture which produces a relatively large exit pupil at the viewing position within the control station. It should be mentioned here that in the form of the invention now preferred, the individual optical systems that make up the optical system as a whole are closely spaced in the half of the scanning head representing the forward direction of the simulated ship and are spaced further apart in the rearward half as clearly shown in Figure 3.

The prism 130 deflects the rays outwardly and upwardly of the scanning head along the previously mentioned axis 91. In the preferred embodiment of the invention, the sleeves or barrels 129 carrying the objective lens elements will be moved to focus the objective lens systems in accordance with the changes in the distance between the two hypothetical ships, that is, the distance between a scanning head and the ship model mounted to the problem table associated therewith. For this purpose the clamping structure, generally designated 115, includes a longitudinally movable rod 137 carrying at the lower end thereof a spider 138, the individual legs of which are fixed to the sleeves or barrels 129 carrying the objective lens assemblies. It will be seen that longitudinal movements of the rod 137 will axially move the sleeves 129 and this movement of the rod 137 is brought about by a follower 139 carried by the rod 137 at the upper end thereof and a face cam 140 which, as will be later explained, is moved in accordance with the changes in the distance between the two hypothetical ships. The cam 140 is carried by the shaft of a positioning motor 141 mounted within the chamber 114 and electrically connected to a syno-generator to be described. The motor 141 is operated in accord with movement of the problem table associated with the scanning head and suffice it to say now, as the distance from the scanning head to the corresponding ship model changes, the position of the sleeves 129 will correspondingly change to maintain each objective lens assembly in best focus for all positions of the ship's model relative to the scanning head.

*Problem table structure*

Figure 7:
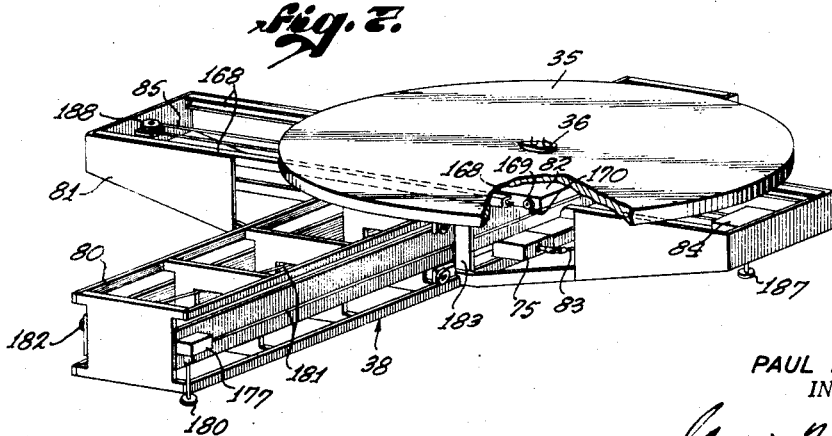
Figure 7 is a perspective view with parts broken away showing the upper portion of the problem table.

The problem table structure, as shown in Figures 6, 7, and 8 includes a framework, generally designated 145, that supports a lower thrust bearing 146 and an upper bearing 147 in which bearings is journalled the previously mentioned problem table shaft 37. The shaft 37 is of hollow construction and has a lower portion 148 extending below the thrust bearing 146 to carry a series of slip rings 149 required for the wiring system. The slip rings 149 cooperate with a corresponding plurality of brushes 150 mounted on a vertical panel 151.

The previously mentioned positioning motor 60 which governs the rotary position of the problem table is mounted in the bottom of the framework 145 and, as shown in Figure 6, actuates means including a suitable worm 154 in mesh with a worm gear 155 on the bottom end of the problem table shaft 37.

The main support member formed by the radial track member 80 of the track assembly 38 is of hollow box-like rigid construction and is suitably mounted on a base plate 156 on the upper end of the shaft 37 to swing in various radial directions in accord with rotation of the shaft. Preferably, the radial track member 80 extends equal radial distances across the axis of the shaft 37 as shown in Figure 6.

The cross track member 81 is mounted for movement along the radial track member 80 in any suitable manner. In the particular construction shown in the drawing, a pair of angle members on each side of the radial track member 80 provide a lower rail 160 and an upper dependent rail 161 for cooperation with suitable rollers of the cross track member 81. As best shown in Figure 8, a plurality of guide rollers 162 engage the bottom rail 160 from opposite sides and a plurality of support rollers 163 ride on the upper surface of the rail. Another plurality of guide rollers 164 engage each of the upper rails 161 from opposite sides and rollers 165 ride along the lower edges of the upper rails. Thus, the cross track member 81 is freely movable on the radial track member 80 longitudinally thereof.

As may be seen in Figure 6, the cross track member 81 which is cut away to clear the radial track member 80 has a pair of longitudinal rails 168 above the level of the radial track member 80 to movably support the previously mentioned carriage 82. In the construction shown, the two rails 168 comprise a pair of channel members mounted inside the cross track member. As shown in Figure 7, the carriage 82 has a plurality of support rollers 169 to ride on each rail 168 and a plurality of guide rollers 170 to contact the rail from the side. The problem table 35 is mounted on the carriage 82 by a suitable radial supporting frame 171, as best seen in Figure 6.

It is apparent from the foregoing description that the required north-south component of relative motion may be imparted to the problem table 35 by shifting the cross track member 81 on the radial track member 80 and that the east-west component of relative motion may be imparted by shifting the carriage 82 along the cross track member. The manner in which these two components of motion are imparted by the two positioning motors 71 and 75 may be understood by considering the showing of Figure 9 in conjunction with Figures 6, 7, and 8.

As best shown in Figure 9, the positioning motor 71 for controlling the north-south component is connected by a shaft 175 and suitable universal joint 176 with a gear box 177 that actuates a drive pulley 178. The mechanism in the gear box 177 includes a suitable clutch (not shown) which is controlled by a hand screw 180. When the hand screw 180 is tightened, the drive pulley 178 is operatively connected with the positioning motor 71, and the hand screw may be loosened when desired to free the drive pulley from the position motor so that the cross track member 81 may be freely moved along radial track member 80 independently of the motor. The drive pulley 178 controls an endless cable arrangement in which a cable 181 is passed around three guide pulleys 182 in the manner shown, the cable being connected to structural portions 183 of the cross track member 81 on opposite sides of the radial track member 80. Thus, actuation of the position motor 71 in one direction will move the cable 181 in the directions indicated by the arrows in Figure 9 to shift the cross track member 81 in one direction longitudinally on the radial track member 80, while operation of the motor in the opposite direction will produce movement of the member 81 in the direction opposite to the arrows.

In like manner, the positioning motor 75 carried by the cross track member 81 actuates a drive pulley 186 in the gear box 84 and here again a clutch (not shown) is provided under control of a hand screw 187. The drive pulley 186 controls the previously mentioned endless cable 85 which passes around a guide pulley 188 at the other end of the cross track member and is operatively connected to a structural portion of the carriage 82 as indicated at 189 in Figure 9.

It should be clear now the track member 81 and carriage 82 are each movable longitudinally in paths normal to each other by selective operation of the motors 71 and 75, respectively.

*Range indicating system*

The preferred practice of the invention includes a system responsive to changes in the distance between the model ship 36 and the corresponding scanning head 45. This distance-responsive system preferably has the three functions of, first, indicating the simulated range, second, to operate limit switches to restrict movement of the problem table on the track assembly, and, third, to vary the focus adjustment of the associated optical system. These various purposes may be carried out in various ways in various practices of the invention.

In the present arrangement, the model ship 36 is in the center of the problem table 35 and the carriage 82 is provided on its under side with a depending post 200 which is on the same axis as the spindle 64 on which the ship model is pivotally mounted. The post 200 extends downward to a level slightly above the top of the radial track member 80 and is hollowed out on its lower end to receive and anchor the end of a measuring cable 201. The measuring cable 201 passes over a pulley 202 to extend downward through the problem table shaft 37 to the bottom end of the shaft. From the bottom end of the shaft 37 the measuring cable 201 passes over a guide pulley and extends to the periphery of a measuring wheel 203 where the cable is anchored.

The measuring wheel 203 preferably has a circumference slightly greater than the maximum magnitude of the cable movement required so that the measuring wheel makes less than one complete rotation to cover the maximum radial movement of the model ship 36 relative to the axis of the shaft 37. A suitable spring (not shown) continuously urges the measuring wheel 203 in a direction to maintain the measuring cable 201 under tension so that the rotary position of the wheel varies directly as the distance of the ship model from the axis of the shaft 37. A suitable limit switch 206 is operated by a finger 207 on the measuring wheel 203 whenever the ship model 36 is moved to predetermined limit distances either near to or away from the axis of the shaft 37, the limit switch serving to de-energize the positioning motor circuits to prevent damage to the apparatus.

In the preferred practice of the invention, the measuring wheel 203 is connected by suitable telemetering means both to the previously mentioned range indicating device 29 at the control station and the previously mentioned focusing sleeves 129 of the optical system. For this purpose, the measuring wheel 203 is operatively connected to a synchro-generator 208 which is interlocked with a corresponding synchro-repeater (not shown) in the range indicating device and is also electrically interlocked with the previously mentioned positioning motor 141 that controls the focusing sleeves 129. Thus, the indicating means 29 responds to movements of the measuring wheel 203 to indicate the range to the ship under observation and the optical system is automatically maintained in best focus on the ship model 36 at all times.

*Manually controlled dual computer*

Figure 11 is an elaboration of that portion of the diagram in Figure 10 pertaining to the dual computer 50, the dual computer being indicated by the dotted rectangle 50 in Figure 11.

It can be seen in Figure 11 that the dual computer 50 includes an individual computer A corresponding to ship A and an individual computer B corresponding to ship B. Each individual computer is connected to the corresponding bridge or control station to receive a helm input 51 and two engine speed inputs 52 and 53, respectively, which respond to change in position of the two telegraph controls 26 and 27 for the engines driving the starboard and port propellers respectively, as previously explained. The individual computer A has an output shaft 56 corresponding to the output 56 in Figure 10 and the individual computer B in like manner has an output shaft 57 corresponding to the output 57 in Figure 10.

The heading output shaft 56 from the individual computer A is operatively connected to a telemetering system that includes the previously mentioned positioning motors 60 and 61 of Figure 10. For this purpose, Figure 11 shows a synchro-transmitter 215 that is energized by two leads 216 from a suitable A. C. source and is electrically interlocked with the two positioning motors 60 and 61 by three wires 217. In like manner, the output shaft 57 from the individual computer B is operatively connected to a synchro transmitter 220 that is electrically interlocked with the positioning motors 66 and 68 of Figure 10 by means of three wires 221.

Individual computer A has an output shaft 224 for the contribution by ship A to the rotation of a shaft 58 which corresponds to the north-south motion component output 58 in Figure 10. The shaft 224 in Figure 11 is connected by a pair of bevel gears 225 to a shaft 226 that is connected to a set of differential gears 227. In like manner, an output shaft 228 for the contribution to the north-south component by ship B extends from individual computer B and is operatively connected by bevel gears 230 and a shaft 231 to the same set of differential gears 227. The set of differential gears 227 rotates output shaft 58 in accord with the combined rotation of the two shafts 224 and 228. The output shaft 58 is connected to a synchro transmitter 234 which is interlocked by a set of three wires 235 with the two position motors 71 and 73 of Figure 10 associated with the two problem tables, respectively.

An output shaft 236 from the individual computer A that rotates in accord with the contribution by ship A to the east-west component is operatively connected by a pair of bevel gears 237 and a shaft 238 to a second set of differential gearing 240. In like manner, an output shaft 241 from individual computer B which presents the contribution of ship B to the east-west components is connected by a pair of bevel gears 242 and a shaft 243 to the set of differential gears 240. The differential gears 240 combine the rotation of shafts 236 and 241 in the rotation of an output shaft 59 which corresponds to the east-west relative motion component output 59 in Figure 10. In Figure 11, the output shaft 243 is operatively connected to a synchro transmitter 244 which is interlocked by a set of three wires 245 with the two east-west positioning motors 75 and 77 associated with the two problem tables, respectively.

In a simple practice of the invention in which the characteristic responses of the ships are introduced, each of the individual computers A and B is manipulated by an operator who uses tables of ships characteristics and his judgement and experience as to how a ship would respond in heading and speed in response to manipulation of the navigation controls on the simulated bridge. The construction and mode of operation of such a manually operated individual computer may be understood by referring to Figure 12 which shows the essential components involved.

The input into the individual computer in Figure 12 that responds to the helm on a bridge is an input shaft 51 that carries a pointer 250, the input shaft 51 of Figure 12 being the input shaft 51 of Figure 11. The operator of the individual computer in Figure 12 keeps the pointer 250 under observation and continually notes the position of the pointer relative to a suitable scale 251 on a panel 252.

A second panel 253 has a scale 254 traversed by a pointer 255 on an input shaft 52 corresponding to an input shaft 52 in Figure 11. A third panel 256 has a scale 257 to be read with reference to a pointer 258 on a shaft 53 corresponding to shaft 53 in Figure 11.

The operator of the individual computer shown in Figure 12 is selected for his knowledge of the characteristic manner in which a ship will respond to the navigation controls on the bridge with respect to rates of change of heading and rates of change of ship's speed. He continually observes the behavior of the three pointers 250, 255, and 258 and uses his judgement and experience to manipulate a first hand lever 260 and a second hand lever 261. The position of the first lever 260 represents the operator's judgement as to the heading of the ship and the adjustment of the second lever 261 represents his judgement as to the ship's speed.

Lever 260 is mounted on an output shaft which, in the case of computer A in Figure 11, is the output shaft 56 leading to the synchro transmitter 215. As indicated diagrammatically in Figure 12, the shaft 56 is operatively connected as by suitable bevel gears (not shown) to a countershaft 262 on which are mounted two separate crank arms 265 and 266 angularly disposed 90 degrees apart on said countershaft for operation therewith. Crank arm 265 slidingly engages in a transverse slot 269 of an actuating member 270, the actuating member being connected to an operating rod 271 and being suitably guided and confined to move only in the direction represented by the axis of the operating rod. The operating rod 271 controls a cage 272 confining two transmission balls 273 that operatively connect the face of a friction disc 274 with the periphery of a driven drum 275, the two balls, disc, and drum comprising a well known integrating mechanism such as a conventional ball and disc integrator.

In like manner, crank arm 266 engages a slot 278 of a second actuating member 279 which is connected by an operating rod 280 with the cage 282 of a second integrating device comprising a pair of balls 283, a friction disc 284 and a driven drum 285. The driven drum 275 actuates the output shaft 224 corresponding to output shaft 224 in Figure 11 and the driven drum 285 actuates the output shaft 236 corresponding to the output shaft 236 in Figure 11.

The second manually controlled lever 261 which represents the ship's speed is operatively connected to a shaft 288 having a gear 289 in mesh with a second gear 290. The second gear 290 is a rotary nut threaded to receive a coaxial screw 291 which is moved longitudinally in response to rotation of the gear. Screw 291 controls the position of a ball cage 292 of a third integrator comprising a pair of balls 293, a friction disc 294 and a driven drum 295.

A suitable prime mover (not shown) actuates a drive shaft 296 that carries the friction disc 294 and thereby rotates the driven drum 295 at a relative speed depending upon the position of the two balls 293 relative to the center of the friction disc 294. The driven drum 295 actuates the two friction discs 274 and 284 by means of suitable shafts 297, 298 and 299. By virtue of the arrangement shown, the position of the two balls 273 relative to the center of the friction disc 274 varies as the sine of the ship heading and the relative position of the two balls 283 with respect to the center g the disc 284 varies as the cosine of the ship heading. As a result, output shaft 224 rotates at a speed in accord with the north-south component contributed by the ship and shaft 236 rotates at a speed in accord with the east-west component.

*Automatic individual computer*

The automatic individual computer shown in Figure 13 will be described by way of example as adapted for use as the individual computer A in Figure 11. Thus the computer shown in Figure 13 has the three input shafts 51, 52, and 53 of Figure 11, and the three output shafts 56, 224, and 236.

The individual computer shown in Figure 13 comprises a combination of units or individual mechanisms which will first be described in a general way with reference to their basic functions and will later be described in detail.

Unit C is connected to input shaft 53 from the port engine order telegraph and introduces the speed, acceleration and deceleration characteristics of the engine. In like manner unit D is connected to input shaft 52 from the starboard engine order telegraph to introduce the characteristics of that engine with respect to speed, acceleration and deceleration.

Unit F comprises a differential means here shown as differential gearing which is operatively connected to units C and D to derive a factor for the additive effect of the two engines with respect to the ship's speed.

Unit H is operatively connected to unit F to introduce the ship's acceleration characteristics as a function of the additive effect of the two engines. The output of unit H is a factor for the instant speed of the ship on a straight course. This factor is transmitted to the five units L, M, N, P, and Q.

The function of unit L is to derive the instant speed rate of the ship for any course by combining the instant speed factor from unit H with a factor that accounts for the loss of speed of the ship in turns. Unit L obtains this last factor from the rudder control input shaft 51 as modified by units E and K successively. Unit E accounts for the rudder laying rate, i. e. the lagging response of the rudder to the wheel or rudder control, and unit K accounts for the time delay in rudder effect on speed loss in turns.

Unit M takes the instant speed factor from unit H and the rudder position from unit E to derive the yaw angle due to rudder action and instant speed combined. The function of unit N is to combine the instant speed factor from unit H with a factor representing the differential effect of the two engines thereby to derive yaw angle due to engine differential and instant speed. For this purpose unit N is operatively connected with unit G which comprises differential gearing to derive the differential engine effect from units C and D. The two yaw angle units M and N transmit their output to differential gearing 300 which in effect adds the two angles to derive a total yaw angle.

The purpose of units P and R is to derive the yaw rate due to differential engine effect. Unit P receives the instant speed factor from unit H and derives a factor of the yaw rate due to engine differential as a function of ship's speed. This yaw rate factor is transmitted to unit R which is operatively connected to unit G to derive the desired yaw rate due to engine differential as a function of ship's speed.

The purpose of units Q, S, and V is to derive the yaw rate due to rudder action. Unit Q is operatively connected with unit H to derive a factor of the yaw rate due to rudder action as a function of ship's speed. Unit V is connected to unit E to introduce time delay in yaw rate due to rudder action. Unit S receives the output of units Q and V to derive the desired yaw rate due to rudder action as a function of ship's speed.

The two yaw rates derived by units R and S are combined by differential gearing 301 to derive a factor representing the instant course of the ship. Another set of differential gears 302 combines this instant course factor from differential gears 301 with the previously mentioned total yaw angle from differential gears 300 to derive the instant heading of the ship which is transmitted to the previously mentioned output shaft 56.

The functions of units Y and X are to derive the two components of the ship's speed to be transmitted to the output shafts 236 and 224 respectively. Each of these units receives the instant speed rate from unit L and the instant course of the ship from differential gears 301.

In unit C input shaft 53 from the port engine telegraph rotates a worm 305 and a gear wheel 306 through differential gearing 307 which adds the rotation of input shaft 53 and a shaft 308. Shaft 308 is the output of a shaded pole motor 310 which is controlled by a switch arm 311, which switch arm is controlled by a cam follower 312 that cooperates with a cam 313 on the gear wheel 306. Switch arm 311 which serves as a reversing switch is always in one of its two reversing positions, the arrangement being such that motor 310 constantly reverses itself as long as input shaft 53 is stationary. This arrangement prevents rotation of shaft 308 through the differential gearing 307 when input shaft 53 is rotated, thereby assuring that cam 313 will be turned by any rotation of input shaft 53.

When the input shaft 53 is rotated, motor 310 operates continuously in one direction driving shaft 308, differential gearing 307 and gear wheel 306 in such direction as to restore cam 313 to its original position shown in Fig. 13. The restoration movement of the cam is opposite to the rotation caused by the input shaft 53.

Motor 310 rotatably driving shaft 308 also rotates a second shaft 316 to a new position representing a different engine speed. Shaft 316 by means of a worm 317 and a worm gear 318 moves a wiper 320 or contact along a potentiometer resistor 321. In Figure 13 wiper 320 is at the center position representing zero engine speed on resistor 321, at which center point the resistor is tapped by a conductor 322. Conductor 322 completes an electrical circuit that includes the shading coils 323 of the motor 310, the reversing switch arm 311, and a conductor 324 from the reversing switch arm to the wiper 320.

When the wiper 320 is at this center point, the motor 310 operates at maximum speed in one of its two directions thereby imparting maximum rate of rotation to the shaft 316 to represent maximum engine acceleration rate. The conductor 322 may be connected at two tap points on resistor 321 if it is desired to have points of maximum simulated engine acceleration rate other than zero engine speed.

When shaft 316 is positioned to represent engine speed other than at maximum acceleration, a portion of a second resistor 327 is introduced into the shading coil circuit of motor 310 to decrease the rate of rotation of the motor and hence the positioning rate of shaft 316.

A series of switch arms 330 operatively connected with switch arm 311 for actuation therewith are each connected to an adjustable contact 331 on the second resistor 327. The purpose of the switch arms 330 is to connect the contacts 331 with one or the other of a pair of contacts on the first resistor 321 according to the direction of operation of the corresponding ship engine. Figure 13 shows a pair of contacts for each switch arm 330 each of the contacts being connected by a conductor 333 with a contact 334 that is adjustable along the resistor 321.

When a change in engine speed is called for, wiper 320 introduces a portion of resistor 321 shunted by a portion of resistor 327 into the shading coil circuit of motor 310 to cause shaft 316 to rotate at a rate to simulate the desired engine acceleration rate. Switch arms 330 change the effective resistance introduced into the shading coil circuit of motor 310 for any given position of contact 320 on resistor 321 when the direction of rotation of motor 310 is reversed. Such a shift change is necessary since the acceleration characteristics of a ship's engine may be different from the deceleration characteristics both forward and reverse. Energization of motor 310 is accomplished by an A. C. voltage applied continuously to the field coil 335 of the engine motor.

Unit D which receives its input from shaft 52 for the starboard engine need not be shown nor described in detail since it is identical with unit C.

The differential gearing comprising the unit F receives the output from unit C by means of a shaft 339 that is actuated by the previously mentioned shaft 316, and in like manner receives the output from unit D by means of a shaft 340. Unit F combines the rotation of these shafts to adjust the position of an output shaft 341 which actuates a worm 342 in the unit H which introduces the ship's acceleration characteristic as a function of the additive effect of the two ship engines.

In unit H worm 342 actuates a gear wheel 343 carrying a cam groove 344 to control a cam follower 345 in a manner proportional to ship acceleration as a function of the additive effect of the engine speeds. Cam follower 345 is directly connected to the ball cage 346 of a ball and disc integrator, generally designated 347, the driving disc 348 of which is rotated at a constant speed by a motor represented by the letter T.

When the ball case 346 is exactly centered on the driving disc 348 by the cam follower 345, no rotary motion is imparted to the balls and therefore the cylinder 349 of the integrator does not rotate. The ball cage 346 is exactly centered whenever the algebraic sum of the engine speeds is zero as represented by the position of shaft 341. When the algebraic sum of the engine speeds is not zero, ball cage 346 is moved from the center of driving disc 348 by cam follower 345 to impart rotary motion to cylinder 349 at a rate proportional to ship acceleration for the sum of the engine speeds as represented by the position of shaft 341.

Cylinder 349 drives the input disc 350 of a second integrator, generally designated 351, which is also included in unit H and is adapted to act as a closed loop servo device. The previously mentioned shaft 341 positioned the ball cage 353 of the integrator 351 by means of a screw 354, gearing 355, and differential gearing 356. Whenever the ball cage 353 is displaced from its normal position at the center of the driving disc 350, rotary motion is imparted to the cylinder 357 of the integrator which rotates a shaft 358 to a position which is proportional to instant ship's speed on a straight course. Shaft 358 also feeds back rotary motion to screw 354 through the differential gearing 356 and the gearing 355 thereby to return the ball cage 353 to the center of driven disc 350, the rate of return for any given rate of rotation of disc 350 being proportional to the ratio of gearing 355. This feed back feature of the closed loop servo provides the required time delay for ship acceleration. Consequently shaft 358 is always at a position proportional to instant speed on a straight course and therefore can be used as a positioning input for units L, M, N, P, and Q.

To simulate the actual instant speed on any course, it is necessary to multiply the instant speed on a straight course by a correction factor proportional to speed loss in turn as a function of rudder angle. The required correction factor is derived by units E and K and is applied by unit L.

In unit E rotation of the input shaft 51 from the rudder control is transmitted through differential gearing 360 to a worm 361 that rotates a gear wheel 362 carrying a cam 363. A cam follower 364 actuated by the cam 363 controls a reversing switch arm 365. The switch arm 365 alternates between two contacts which are connected by conductors 366 respectively to one side of the shading coils 367 of a shaded pole motor 368. The shading coil circuit includes a resistor 369 and a contact 370 which is adjustable along the resistor and is connected by a conductor 371 with the reversing arm 365. Contact 370 does not respond to operation of the switch arm. The shaded pole motor 368 has one output shaft 374 connected to the differential gearing 360 and a second output shaft 375 for the output from the unit.

It can be seen that unit E operates in the same general manner as the previously described unit C. Since there is no "off" position of reversing switch arm 365, the shaded pole motor 368 is constantly reversing itself as long as shaft 51 is stationary. When input shaft 51 rotates, the motor 368 operates continuously in one direction to actuate the worm 361 through the differential gearing 360 to restore cam 363 to its original position, the restoration rotation of the cam being in the direction opposite to the rotation caused by input shaft 51. Thus the shaded pole motor 368 rotates its output shaft 375 in accord with the rudder laying rate of the hypothetical ship. Contact 370 is manually adjusted in accord with the rudder-laying characteristics of a particular ship and may be readily changed to simulate a casualty or to conform to the characteristics of a different ship.

In unit K rotation of the output shaft 375 from unit E is transmitted to a closed loop servo to introduce an appropriate time delay as required to correctly reproduce speed loss in turn characteristics as a function of rudder angle. Rotation of shaft 375 is transmitted through differential gearing 377 and gearing 378 to a screw 379 that controls the ball cage 380 of an integrator, generally designated 381. The ball cage 380 transmits motion from a disc 382 to a cylinder 383, the disc being driven by a constant speed motor T. The cylinder 383 acting through differential gearing 377 restores the ball cage 380 to its normal central position over the delay period and in doing so rotates an output shaft 384 that is connected to unit L.

In unit L the output shaft 384 of unit K moves the ball cage 387 of an integrator generally designated as 388 by means of a worm 389, a gear wheel 390, a cam groove 391 in the gear wheel, and a cam follower 392. The rotation of a disc 393 driven by a motor T is transmitted to a cylinder 394. Rotation of the cylinder 394 is transmitted to an input disc 395 of a second integrator, generally designated 396, that is included in unit L. A ball cage 397 transmits motion from the disc 395 to a cylinder 398 which actuates an output shaft 400 from unit L. The position of the ball cage 397 is controlled by the output shaft 358 from unit H by means of gearing 401 and a screw 402.

Disc 395 is driven by cylinder 394 at a rate proportional to speed in turn as a function of rudder angle. Note that for zero rudder angle the output rate of integrator 381 is proportional to maximum instant speed on a straight course. Shaft 358 from unit H always has a position proportional to instant speed on a straight course and disc 395 always has a rate proportional to speed in turn as a function of rudder angle. Since the ball cage 397 is controlled by the output shaft 358 from unit H, output shaft 400 from unit L will rotate at a rate proportional to instant speed for any course desired.

The instant course is the angle between a chosen reference line or direction and a line tangent to the ship's course at the time being considered. It is equal to instant heading when no yaw angle is present. A change in instant course usually occurs as a result of rudder action but is also obtained as a result of the moment applied to a ship due to a difference in engine speeds. Yaw angle is the angle between instant course and instant heading and is brought about by rudder action and/or a difference in engine speeds.

In unit M for deriving the yaw angle due to rudder angle and instant speed, a rudder yaw angle cam 405 is mounted on axle 406 and is free both to rotate on and slide along the axle. Rudder angle shaft 407 which is operatively connected with the output shaft 375 of unit E for rotation therewith, actuates a pinion 408 which in turn rotates cam 405 through a rotational position proportional to rudder angle, the pinion 408 being enmeshed with a gear 409 that is unitary with the cam. An instant speed positioning shaft 410 driven by the output shaft 358 from unit H rotates a screw 411 to shift a traveling nut 412 which in turn shifts cam 405 along axle 406. Pinion 408 is long enough to maintain engagement with gear 409 regardless of its positioning by nut 412.

For each axial position cam 405 may assume as a result of rotations of screw 411, and for each angular position due to rotation of pinion 408, the distance from the center of axle 406 to a point on the surface of the cam is proportional to the yaw angle due to the rudder angle and the instant speed represented by the point chosen. Therefore the position of a cam follower 415 held against the cam 405 by a spring 416 represents yaw angle proportional to rudder angle and instant speed.

The cam follower 415 presents the form of a rack in engagement with a pinion 417 to rotate an output shaft 418, which output shaft is operatively connected with the previously mentioned differential gearing 300. Unit N which derives the yaw angle due to engine differential and instant speed is of the same construction as unit M described above. Thus unit N includes an engine yaw angle cam 420 that is rotatably and slidably mounted on an axle 421. Rotation is imparted to cam 420 by unit G which comprises differential gearing which algebraically subtracts the rotations of the previously mentioned shafts 339 and 340 from units C and D, respectively, and transmits the difference between the two rotations to an output shaft 422. Output shaft 422 drives a second shaft 423 which carries a pinion 424 enmeshed with a gear 425 that is unitary with the cam 420. It can be seen that the rotary position of the cam 420 depends upon the difference in the speeds of the two engines. The cam 420 is moved axially by a traveling nut 426 which in turn is actuated by a screw 427. The screw 427 is rotated by a shaft 428 that is driven by the previously mentioned output shaft 358 from unit H.

A follower 430 in the form of a rack enmeshed with a pinion 431 is pressed against the surface of cam 420 by a suitable spring 432. Pinion 431 actuates the shaft 433 that is operatively connected to the previously mentioned differential gearing 300. The position of engine yaw angle output shaft 433 represents yaw angle proportional to difference in engine speeds and instant speed. Differential gearing adds the rotation of output shafts 418 and 433 to position an output shaft 434 in accord with the total yaw angle derived from the rudder and the two engines. Output shaft 434 is operatively connected with the previously mentioned differential gearing 302.

Unit P which derives a factor of the yaw rate due to engine differential as a function of ship speed, has an input shaft 435 which is driven by the previously mentioned output shaft 358 from unit H, the position of the output shaft representing the instant speed on a straight course. The input shaft 435 of unit P controls a ball cage 437 of an integrator, generally designated 438, by means of a worm 450, a gear wheel 451, a cam groove 452 carried by the gear wheel, and a cam follower 453 that is operatively connected to the ball cage. The motion of a disc 454 driven at a constant speed by a motor T is transmitted by the ball cage 437 to a cylinder 455 that actuates an output shaft 456.

Unit R which derives the yaw rate due to engine differential as a function of ship's speed includes an integrator 459 having a disc 460 driven by the output shaft 456 from unit P. Rotation of the disc 460 is transmitted to a cylinder 462 by a ball cage 461. The position of the ball cage 461 is controlled by the output shaft 422 from unit G by means of a worm 463, a gear wheel 464, a cam groove 465 in the gear wheel, and a follower 466 that is directly connected to the ball cage 461. Therefore cylinder 462 rotates an output shaft 467 at a rate proportional to the yaw rate (rate of change of course) caused by the difference in the two engine speeds at any given ship speed.

Unit Q, which derives the yaw rate due to rudder action as a function of ship speed, includes an integration, generally designated 470, having disc 471, a cylinder 472, and a ball cage 473 to transmit motion from the disc to the cylinder. The disc 471 is driven at a constant rate by a motor T and the ball cage 473 is controlled by the output from unit H. For this purpose unit H actuates a worm 474 enmeshed with a gear wheel 475 and the ball cage 473 is connected to a follower 476 that engages a cam groove 477 in the gear wheel. Cylinder 472 actuates an output shaft 478 that drives a disc 480 in the unit F that derives the yaw rate due to rudder action as a function of ship speed. Disc 480 is part of an integrator, generally designated 481, having a ball cage 482 that transmits rotation of the disc to a cylinder 483. The position of the ball cage 482 is governed by a cam follower 484 that rides in a cam groove 485 in a gear wheel 486. A gear wheel 486 is controlled by a worm 488 that is actuated by an output shaft 489 from unit V.

The function of unit V is to position the ball cage 482 in response to rotation of the input shaft 51 from the rudder control of the ship and in doing so to introduce a time delay in the yaw rate due to rudder action to simulate the delay caused by the moment of inertia of the ship. Unit V comprises a closed loop servo of the character heretofore described having a disc 492 driven at constant speed by a motor T. A ball cage 493 transmits rotation of the disc to a cylinder 494 which actuates the previously mentioned shaft 489. The previously mentioned output shaft 375 from unit E is operatively connected by a shaft 495 with differential gearing 496 in unit V which in turn is connected through gearing 497 to a screw 498 for controlling the ball cage 493. Feed back to the ball cage from the cylinder 494 is provided by a shaft 499 that operatively connects the cylinder with the differential gearing 496.

Rudder cam 485 moves cam follower 484 and ball cage 493 to provide a position which is proportional to yaw rate as a function of rudder angle. Since driving disc 480 in unit S rotates at a rate proportional to yaw rate due to rudder action as a function of ship speed, cylinder 483 rotates at a rate proportional to rate of change of course due to rudder action at any given ship speed. Cylinder 483 actuates an output shaft 500 that is connected to the previously mentioned differential gearing 301. Differential gearing combines the rotation of shafts 467 and 500 to rotate an output shaft 501, the position of which is at all times proportional to instant course. Note that the position of output shaft 501 is proportional to instant course and the rate of rotation of the shaft is proportional to rate of change of course.

The previously mentioned differential gearing 302 combines the rotation of shaft 501 with rotation of the previously mentioned shaft 434 to rotate the previously mentioned output shaft 56 from the computer, the position of the output shaft representing the instant heading of the ship. It can be seen that differential gearing 302 adds the total yaw angle represented by the position of shaft 434 into the instant course of the ship represented by shaft 501 to obtain the instant heading.

As heretofore described the problem table by virtue of its N–S and E–W track assemblies requires that instant speed be resolved into two components 90 degrees apart. It is necessary, therefore, to multiply the instant speed by the sine and cosine of instant course and this is done by means of units Y and X.

The instant course shaft 501 is connected by a shaft 502 to a shaft 503 which carries cranks 504 and 505 positioned 90 degrees apart. Cranks 504 and 505 drive slotted members 506 and 507 respectively, each of which is restrained so as to move only in a direction perpendicular to its slot. Actuator rods 508 and 509 respectively operatively connect the two slotted members with ball cages 510 and 511 of two integrators designated 512 and 513 respectively. It can be seen that actuator rods 508 and 509 position ball cages 510 and 511 respectively in proportion to the sine and cosine of instant course. The two driving discs 514 and 515 of the two integrators 512 and 513, respectively, are driven by the output shaft 400 from unit L which rotates in proportion to the instant speed of the ship.

It is apparent, therefore, that the output cylinders 516 and 517, respectively, of the two integrators 512 and 513, respectively, will rotate at rates proportional to the north-south and east-west components of instant speed. The two output cylinders 516 and 517 are connected respectively to the previously mentioned output shafts 224 and 236, these two shafts being the output shafts of the computer.

It should be understood now that the computer and the dual system described having the two functionally inter-locked control stations representing two ships in the same area will produce accurate simulation of all changes in speed, bearing, and relative position of the two ships. This is so, for when the operation of the ship controls at the one station simulate a change in heading, the problem table at the same station revolves about the axis of its scanning head and at the same time the model of the ship at the other station revolves in the opposite direction to the same extent about a pivot on the other problem table. Since simulated movement by either control station changes the distance at each problem table from the scanning head to the model on the table, both problem tables shift in response to both control stations.

As has been seen, the various cams in the computer determine the output of the various units to produce the end output function, and the various cams are actually formed to introduce the particular characteristics of one ship. Thus, it is possible to form cams which will introduce into the computer the characteristics of, for example, a cruiser having certain known ship control characteristics and a second set of cams in the other half of the computer which will introduce the characteristics, for example, of a battleship. With these cams in operation the two functionally interlocked control stations will then afford accurate simulations of all changes in speed, bearing, and relative positions of the cruiser and battleship by manipulation of the controls at the two stations.

The cams are removably mounted in the computer and by merely changing the one set of cams as, for example, the cruiser cams, other cams introducing the characteristics of a second battleship, for example, can be substituted therefor and the training device can then be used to simulate the changes in speed, bearing, and relative positions of the two battleships as they respond to the simulated ship controls in the two stations.

It should now be understood the present invention provides a navigation training device for it includes simulated ship handling controls for manipulation by trainees and provides response to the controls to simulate the actual responsive behavior of two ships going under their own power in a simulated sea area.

Although the device of the present invention has been shown and described as one primarily concerned with means for simulating movements of a ship or ships at sea it is not necessarily limited to such use. The present invention in the broadest aspects could be embodied in a device adapted for use in the training of pilots, flight engineers, or similar personnel undergoing aircraft control training programs. In such a use, the control station herein shown would be modified to simulate a cockpit or other aircraft compartment, such as a flight engineer's compartment, and the ship controls would be replaced by suitable aircraft controls.

A scale replica of an airstrip or landing field could be easily mounted to the surface of a problem table and merely by raising or lowering the table by any one of several well-known means, changes in scale altitude could be simulated. Banking of the aircraft during turns may be easily simulated by mounting the complete assemblage, the simulated cockpit and optical assemblies, in gimbals to permit controlled movement of the complete assemblage about a point defined by the intersection of the vertical axis of the scanning head and the horizontal axes of the same. Such an arrangement would present to the trainee a realistic view of the scale terrain carried by the surface of the problem table in all types of aircraft maneuvers. This mounting means could also be used with ship trainers of the type herein shown to simulate pitch and roll of the ship at sea.

Although the now preferred embodiments of the present invention has been shown and described herein, it is to be understood that the invention is not to be limited thereto, for it is susceptible to changes in form and detail within the scope of the appended claims.

I claim:

1. In a training system of the character described for simulating ship maneuvering problems involving a first ship and a hazard such as a second ship, the combination of: a problem table having a surface simulating a sea area, said problem table being mounted for rotation about a fixed axis and for bodily shift laterally relative to said axis; a control station representing the bridge of said first ship in said area; an optical system for forming images of said surface as observed along lines of sight extending radially outward from a preselected point within the area of the table, said point representing the location of said first ship in said area, said optical system including means to view said images outwardly from said control station; a model on said table spaced from said point to represent said hazard in said area for observation through said optical system; simulated ship control means for said first ship at said control station, said control means including a rudder control and means to cause changes in speed of starboard and port ship propellers; a computer responsive to said control means to derive a ship heading and two components of ship motion from said control means; and means responsive to said computer to rotate said table about said axis and to shift the table laterally relative to the axis to shift the relative positions of said preselected point and said model ship in accord with said heading and said components.

2. A training system as set forth in claim 1 in which said preselected point is on said axis; and in which said responsive means rotates said problem table about said axis in response to changes in heading and said responsive means shifts said table laterally relative to said axis in accord with said two components.

3. A training system as set forth in claim 2 in which said computer reproduces the characteristic behavior of a ship with respect to heading and changes in speed in response to change in adjustment of said control means.

4. In a training system of the character described for simulating vehicle maneuvering problems involving a first vehicle and a second vehicle, the combination of: a first station representing the control station of the first vehicle and provided with simulated vehicle controls; a first problem table representing the maneuver area of said two vehicles as viewed from the control station of the first vehicle, said problem table being rotatable about a first axis representing the position of the first vehicle thereby to simulate changes in heading of the first vehicle, said table being movable laterally relative to said axis to simulate the relative movement between the two vehicles; a second station representing the control station of the second vehicle and provided with simulated vehicle controls; a second problem table representing the maneuver area of said two vehicles as viewed from the control station of the second vehicle, said second table being rotatable about a second axis representing the position of the second vehicle thereby to simulate changes in heading of the second vehicle, said table being movable laterally relative to said axis to simulate relative movement between the two vehicles; a first miniature vehicle model pivotally mounted on said second problem table to represent said first vehicle; a second miniature vehicle model pivotally mounted on said first problem table to represent said second vehicle; a first optical system for forming images visible from within said first station of said first problem table and said second vehicle model thereon as viewed radially from said first axis; a second optical system for forming images visible from within said second station of said second problem table and said first vehicle model thereon as viewed radially from said second axis; means responsive to the vehicle controls at said first station to control rotation of said first problem table about its axis and rotation of said first model vehicle on its pivot in accord with simulated changes in heading of said first vehicle; means responsive to the vehicle controls at said second station to control rotation of said second problem table about its axis and rotation of said second model vehicle on its pivot in accord with simulated changes in heading of said second vehicle; and means responsive to the vehicle controls of both said stations to control the lateral movement of both said tables relative to their axes of rotation in accord with changes in direction and distance of the two vehicles relative to each other.

5. A training system as set forth in claim 4 which includes an upright wall around each of said problem tables to represent the sky along the horizon of said maneuver area, each of said walls being rotatable with the corresponding problem table.

6. A training system as set forth in claim 5 in which said two responsive means include means to modify their responses in accord with the characteristic responses of a vehicle to its controls.

7. In a training system of the character described for simulating ship maneuvering problems involving a first ship and a second ship, the combination of: a first station representing the bridge of the first ship, said station being provided with a simulated rudder control and simulated controls for port and starboard engines, respectively; a first problem table representing the sea area of said two ships as viewed from the bridge of the first ship, said problem table being rotatable about a first axis representing the position of the first ship thereby to simulate changes in heading of the first ship, said table being movable laterally relative to said axis to simulate the relative movement between the two ships; a second station representing the bridge of the second ship, said second station being provided with a simulated rudder control and simulated controls for port and starboard engines, respectively; a second problem table representing the sea area of said two ships as viewed from the bridge of the second ship, said second table being rotatable about a second axis representing the position of the second ship thereby to simulate changes in heading of the second ship, said table being movable laterally relative to said axis to simulate relative movement between the two ships; a first miniature ship model pivotally mounted on said second problem table to represent said first ship; a second miniature ship model pivotally mounted on said first problem table to represent said second ship; a first optical system for forming images visible from within said first station of said first problem table and said ship model thereon as viewed radially from said first axis; a second optical system for forming images visible from within said second station of said second problem table and said ship model thereon as viewed radially from said second axis; a computer for translating the adjustments of the controls at said two stations into characteristic ship behavior with respect to the heading and speed of said two ships; means responsive to said computer to control rotation of said first problem table about its axis and rotation of said first model ship on its pivot in accord with simulated changes of heading of the first ship; means responsive to said computer to control rotation of said second problem table about its axis and rotation of said second model ship on its pivot in accord with simulated changes in heading of the second ship; and means responsive to said computer to control lateral movements of both said problem tables relative to their axes of rotation in accord with changes in the relative positions of the two ships.

8. A training system as set forth in claim 7 in which said computer responds automatically to inputs from said rudder controls and engine controls.

9. In a training device of the character described for simulating ship maneuvering problems involving a simulated multi-engine ship and a hazard, the combination of: a problem table having a surface simulating a sea area, said problem table being mounted for rotation about a fixed axis and for bodily shift laterally relative to said axis; a control station operatively associated with said problem table representing the bridge of said ship in said sea area; manually operable means simulating controls for the rudder and multiple engines of said ship carried within said station; an optical system for forming images of said simulated sea area and having optical axes extending radially outward from a preselected point within the area of said table representing the position of said ship in said area; said optical system including means to view said images outwardly from said control station; means on said table spaced from said point to present said hazard in said area for observation through said optical system; a computer, including means responsive to said multiple engine controls to derive a factor for instant speed on a straight course, means motivated by said multiple engine controls to derive a factor for the differential effect of said engines, mechanism actuated by said two factor-deriving means to derive a first yaw angle factor, mechanism operated by said rudder control and said speed factor deriving means to derive a second yaw angle factor, and means responsive to said first and second yaw angle mechanisms for adding said yaw angle factors to obtain a total yaw angle for the ship; and means operated in response to the control action of said computer, as said simulated control means are manually operated within said station, to rotate said problem table about said axis and to shift the problem table laterally relative to said axis to simulate changes in relative positions of said ship and said means representing the hazard, whereby said simulated changes are viewed as actual changes through said optical system.

10. In a training device of the character described for simulating ship maneuvering problems involving a first ship and a hazard, such as a second ship, the combination of: a problem table having a surface simulating a sea area, said problem table being rotatable about a fixed axis intercepting said surface; a control station on said axis of rotation representing the bridge of said first ship in said sea area; an optical system for forming images of said simulated sea area having optical axes extending radially outward over the area of said table from a preselected optical point on said axis of rotation representing the position of said first ship in said area, said optical system comprising an objective lens assembly, an erecting relay lens assembly, including a prism for deflecting image forming rays emerging from said objective lens assembly along the optical axis of said erecting relay lens assembly, and a field lens optically aligned with said relay lens assembly and forming an image thereof to define a relatively large viewing station from numerous positions in which an observer may view said image, the refracting and reflecting elements of said system being so formed and arranged as to produce an erect image of objects in the object space of said objective lens system viewable from within said control station, and a model of a ship on said table spaced from said preselected point to present said hazard in said sea area for observation through said optical system.

11. In a training device of the character described for simulating ship maneuvering problems involving a first ship and a hazard, such as a second ship, the combination of: a problem table having a surface simulating a sea area, said problem table being rotatable about a fixed axis and being laterally shiftable relative to said axis; a control station located on said axis of rotation and operatively associated with said problem table to represent the bridge of said first ship in said sea area; an optical system forming images of said simulated sea area and having optical axes extending radially outward over said table from a point on said axis representing the position of said first ship in said area, said optical system comprising an objective lens assembly, an optical erecting relay means, including reflecting and refracting means, said reflecting means deflecting image forming rays emerging from said objective lens assembly along the optical axis of said refracting means, a field lens, and a plurality of additional reflecting means so arranged as to deflect said rays along the optical axis of said field lens and into said control station whereby an observer within said control station may view the images of objects in the object space of said objective lens assembly, the refracting and reflecting elements of said system being so formed and arranged as to produce an erect image of objects in the object space of said objective lens system, and a model of a ship on said table spaced from said preselected point to present said hazard in said area for observation through said optical system.

12. In a training device of the character described for simulating ship maneuvering problems involving a first ship and a hazard, such as a second ship, the combination of: a problem table having a surface simulating a sea area, said problem table being rotatable about a fixed axis and shiftable laterally relative to said axis; a control station on said axis of rotation and operatively associated with said problem table to represent the bridge of said first ship in said sea area; an optical system, forming images of said simulated sea area, having optical axes extending radially outward over said table from a point on said axis representing the position of said first ship in said area, said optical system comprising an objective lens assembly, an erecting relay lens assembly, including a prism for deflecting image-forming rays emerging from said objective lens assembly along the optical axis of said erecting relay lens assembly, a field lens, and a plurality of reflecting means so arranged as to deflect said rays along the optical axis of said field lens and into said control station whereby an observer within said control station may view the images of objects in the object space of said objective lens assembly, the refracting and reflecting elements of said system being so formed and arranged as to produce within said control station an erect image of objects in the object space of said objective lens system, and a model of a ship on said table spaced from said preselected point to present said hazard in said area for observation through said optical system.

13. In a training device of the character described for simulating vehicle maneuvering problems involving a first vehicle and a hazard such as a second vehicle, the combination of: a problem table having a surface simulating a maneuver area, said problem table being mounted for rotation about a fixed axis and for bodily shift relative to said axis; a control station operatively associated with said problem table representing the control station of said first vehicle in said maneuver area; an optical system for forming images visible from within said station of objects disposed in said simulated maneuver area, said optical system having a plurality of optical axes radiating from a preselected point within the area of said table representing the position of said first vehicle in said area, said control station having a circular series of simulated observation holes corresponding to said plurality of axes for viewing images along the axes, respectively; a model of a vehicle on said table spaced from said point to represent said hazard in said area for observation through said optical system; and means to rotate said table about said axis and to shift the table laterally relative to the axis to change the relative positions of said optical point of said model to simulate changes in relative positions of said two vehicles.

14. A training system as set forth in claim 13 is which said circular series of observation holes is concentric relative to said preselected point and in which said table is rotatable about an axis through said point.

References Cited in the file of this patent

UNITED STATES PATENTS

| | | |
|---|---|---|
| 486,236 | Pierling | Nov. 15, 1892 |
| 2,392,781 | Simjian | Jan. 8, 1946 |
| 2,413,633 | Jones | Dec. 31, 1946 |
| 2,501,350 | Odin | Mar. 21, 1950 |
| 2,505,793 | Rust | May 2, 1950 |
| 2,514,770 | Kittredge | July 11, 1950 |
| 2,536,718 | Brandon | Jan. 2, 1951 |
| 2,543,872 | Schaefer | Mar. 6, 1951 |
| 2,558,425 | Droz | June 26, 1951 |
| 2,579,177 | Miles | Dec. 18, 1951 |
| 2,591,715 | Morey et al. | Apr. 8, 1952 |
| 2,591,752 | Wicklund | Apr. 8, 1952 |
| 2,671,970 | Schmitt | Mar. 16, 1954 |
| 2,705,769 | Cooper | Apr. 5, 1955 |